Aug. 7, 1945.  W. J. COTTON  2,381,209
PURIFICATION OF DIHYDROXY BENZENE COMPOUNDS
Filed Aug. 3, 1942
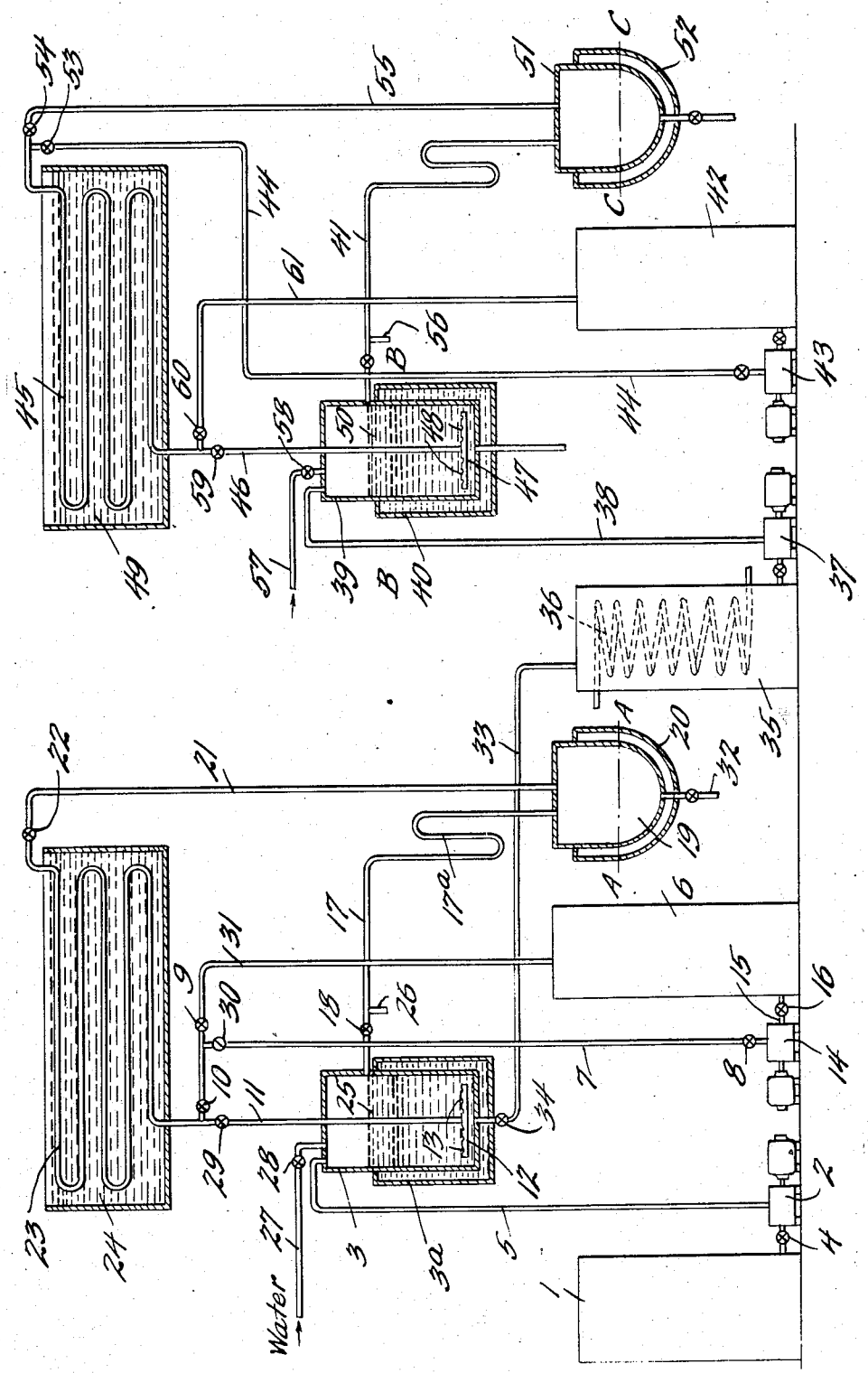
Inventor
William J. Cotton Patented Aug. 7, 1945

2,381,209

UNITED STATES PATENT OFFICE 2,381,209

PURIFICATION OF DIHYDROXY BENZENE COMPOUNDS

William J. Cotton, Chicora, Pa., assignor to Pennsylvania Coal Products Company, Petrolia, Pa., a corporation of Pennsylvania.

Application August 3, 1942, Serial No. 453,450

3 Claims. (Cl. 260—621)

The present invention relates to the production of purified dihydroxy benzenes or derivatives thereof, and especially purified resorcin, catechol, and hydroquinone and derivatives such as purified 4-chlor-resorcin and tetra-chlor-resorcin.

In accordance with the present invention, resorcin is extracted from the so-called neutral liquor which results in the manufacture of resorcin by sulphonating benzene with subsequent fusion with caustic soda of the sodium sulphonates of benzene.

As a result of this treatment, there is produced an aqueous so-called neutral liquor which contains the dihydroxy benzene, as for example, resorcin, together with monohydroxy impurities such as phenol or ortho-chlor-phenol or hydroxy diphenyl sulfone or other organic impurities. In addition, the liquor contains a substantial proportion of inorganic materials such as sodium sulphate, sodium sulphite or mixtures thereof. The character of this liquor may be illustrated by a specific example. This so-called neutral liquor which is really faintly acid to Congo red paper with sulphuric acid may contain from 5% to 20% of resorcin, 1% to 15% of organic matter other than dihydroxy benzene, 1% to 26% of sodium sulphate, and 0% to .5% of free sulphuric acid.

In accordance with the present invention, a neutral liquor containing a predominating proportion of dihydroxy benzene, minor proportions of monohydroxy benzenes or derivatives thereof, other organic compounds, and inorganic compounds, is treated with an extraction medium which will function to dissolve the organic impurities present in the neutral liquor but leave the dihydroxy benzenes or derivatives thereof unextracted and unaltered. While various extraction mediums may be used broadly, the extraction medium should be characterized by the property of being chemically inert relative to the dihydroxy benzene or derivatives which it is desired to recover, and further, the extraction medium should be insoluble or substantially insoluble in the solvent for the dihydroxy benzene which is usually an aqueous solvent such as water. As an example of a suitable extracting agent, mention may be made of benzol, toluol, xylenol, gasoline substantially free from unsaturated compounds, said gasoline being derived from a paraffin base oil, monochlorobenzol, symmetrical tri-chlorobenzol, and ortho-dichlorobenzol. Instead of the extraction medium comprising a single agent, it may be a composite agent consisting of a mixture such as benzol and toluol, said ingredients being present in any proportion ranging from almost 0% to almost 100%.

It may be pointed out that it has been ascertained that the dihydroxy benzenes and their derivatives have a great affinity for water and therefore that it is exceedingly difficult to extract or separate said dihydroxy benzenes or derivatives thereof from water except with a limited class of organic extractants typified by the aliphatic ethers and especially the lower aliphatic ethers such as diethyl ether and isopropyl ethers, isobutyl ethers, and the like, and, where the time of extraction is not of paramount importance, butyl alcohol and other aliphatic alcohols insoluble in water. It is desired to further point out that in the preferred form of the invention, the extraction agent used to extract the dihydroxy benzene bodies from aqueous solutions thereof should not readily form peroxides.

It has been ascertained that the monohydroxy benzenes and their benzene derivatives lose their water readily and therefore may be easily extracted from aqueous solutions by suitable extraction agents.

In accordance with the present invention, after the neutral liquor is treated with the extraction medium adapted to remove the monohydroxy benzene impurities therefrom, the resulting purified neutral liquor is then treated with a supplemental extraction medium or agent to recover therefrom the dihydroxy benzenes including derivatives thereof, and the resulting extractant solution is distilled to recover therefrom the dihydroxy benzene, as for example, resorcin, and simultaneously therewith the organic solvent used in the second extraction step, said organic solvent being re-used in the process. As a result, there is produced a dihydroxy benzene free of monohydroxy benzenes or derivatives thereof, and containing in one form of the invention about 80% of the dihydroxy benzene, as for example, resorcin, about 19% water, and about 1% or less of impurities. The above are illustrative of the character of the purified resorcin, and are not to be taken as a limitation. This purified resorcin containing about 19% water usually has a setting point between 50° and 55° C. If desired, the purified resorcin which is a solid may be dehydrated by vacuum or other appropriate treatment to produce an anhydrous purified resorcin having a setting point of 105° C. or higher. This high setting point indicates that the resorcin has a purity of probably 99% or better since pure resorcin has a setting point of about 109.5° C.

In order to illustrate the present invention, reference will be made to the accompanying drawing which more or less diagrammatically discloses a suitable form of apparatus for carrying out the present invention.

Referring to the drawing, there is provided a storage tank 1 for a neutral liquor of the character above set forth. A pump 2 is provided to pump the neutral liquor from the storage tank 1 into the extraction vessel 3, said storage tank being provided with a valve 4. The extraction vessel 3 is connected to the pump 2 by means of a conduit 5. Adjacent to the extraction vessel is a primary extraction tank 6 adapted to hold a primary extraction medium typified by benzol, said extraction tank 6 being in operative connection with the extracting vessel 3 by means of the conduit 7 provided with valves 8, 30, 10 and 29. The conduit 7 passes centrally through the extraction vessel 3 and terminates in the crowfoot distributor 12 provided with perforations 13 whereby the extraction medium such as benzol passes upwardly through the neutral liquor present in the extraction vessel. A pump 14 is connected by means of a conduit 15 and valve 16 to the primary extraction tank 6 and is also connected by way of the intermediate valve 8 with the conduit 7. In starting up after the extraction vessel 3 has been about three-fourths filled with neutral liquor, the valves 8, 30, 10 and 29 are opened and valve 9 closed, pump 14 started, and benzol from the primary storage vessel 6 passed upwardly through the conduit 7 and downwardly to the crowfoot 12 and rises upwardly therefrom in a finely divided form through the neutral liquor. This mode of operation is continued until sufficient benzol solution has gathered on top of the neutral liquor to allow said benzol solution to flow through overflow pipe 17, the latter being provided with a valve 18. The solution overflows into the primary still 19. When the primary extractant such as benzol carrying dissolved therein monohydroxy benzene or derivatives thereof has reached a height in still 19 indicated by line A—A, then the pump 14 is stopped, valves 8, 30 and 10 closed, and steam is turned into the jacket 20 of the still 19, said steam functioning to vaporize the benzol or other primary extractant. The latter then passes up conduit 21, through valve 22, which is open, and into the condenser 23, the latter being disposed in a water bath 24, said water bath being maintained at a temperature such that it will deliver the primary extractant to the extraction vessel 3 at a temperature below the boiling point of the primary extractant. When benzol is used as the primary extractant, since benzol has a boiling point of approximately 80° C., the temperature of the water bath 24 must be somewhat lower, depending upon the rate of condensation desired. During the time that the primary extractant flows through the conduit 11, the valve 10 is closed.

By this procedure there is automatically maintained an upper layer 25 upon the neutral liquor 3, said upper layer containing extracted monohydroxy benzenes or derivatives thereof. Further, automatically during the period of processing there is maintained an overflow of said extractant medium through the pipe 17 to the still 19, said conduit or pipe 17 being provided with a trap 17a. Operation is continued until a sample of the extractant overflow drawn off through pipe 26 shows upon evaporation no appreciable residue.

There is initially charged into the still 3 a batch of neutral liquor of the character set forth of about 250 gallons. During an ordinary run, 3 to 6 hours are required in order to extract from this amount of neutral liquor the organic monohydroxy benzenes or derivatives thereof. The time of extraction depends on the amount of impurities present in the neutral liquor and the rate at which the primary extraction is cycled through the neutral liquor. Therefore, the period of treatment set forth is by way of illustration and not by way of limitation.

While the temperature of the neutral liquor present in storage tank 1 may vary considerably, it is preferably maintained between 25° to 35° C. The temperature in the extraction vessel 3 will be somewhat higher depending upon the temperature of the primary condensate coming from the condenser 23. The extraction vessel 3 is provided with a jacket 3a through which either steam or water may be circulated in order to effectively control the temperature of the neutral liquor in the extraction vessel 3 somewhat below the boiling point of the primary extractant. For example, when benzol is used as the primary extractant, the latter having a boiling point of about 80° C., the temperature of the neutral liquor in the extraction vessel 3 is maintained at a temperature of 70° C. or lower. It is desired to point out that the temperature of the neutral liquor in the extraction vessel 3 should be maintained at such a point that substantially no dihydroxy benzene, as for example, resorcin, catechol or hydroquinone or derivatives thereof, is extracted by the primary extraction medium, as for example, benzol.

Depending on the composition of the neutral liquor, there may be a chemical interaction between the primary extractant and the impurities present in said neutral liquor, and when that occurs a cooling medium is circulated through jacket 3a. In cool weather, it may be desirable to circulate steam through said jacket in order to maintain the preferred temperature conditions in the extractant vessel.

When the extraction has been completed as shown by the testing of material issuing from pipe 26, then the still 19 is shut down by turning off the steam to the jacket 20. Then water is added to the extraction vessel 3 through pipe 27 and valve 28 until the benzol layer floating on top of the neutral liquor has been entirely displaced and overflowed through overflow pipe 17 into the still 19. Valves 29 and 30 are closed and valves 9 and 10 are opened. Distillation of the primary extractant in still 19 is then resumed, sending the condensate from condenser 23 through line 31 back to benzol storage tank 6. When all the benzol has been removed from the still 19, there remains in the still the monohydroxy compounds that have been extracted from the neutral liquor. The residue remaining in still 19 will be liquid or solid at room temperature, depending upon the amount of the monohydroxy compounds, as for example, phenol which is present in the still mass. While still 19 is still hot, the residue is withdrawn through conduit 32 and is suitably disposed of.

The purified neutral liquor remaining in the extraction vessel 3 is then withdrawn through conduit 33 provided with a valve 34 to purified neutral liquor storage 35. The storage tank 35 is equipped with cooling coils 36 which cool the purified neutral liquor to a temperature below that at which the secondary extractant boils. When the secondary extractant is diethyl ether, the neutral liquor in storage tank 35 is preferably cooled to below 30° C.

From the storage tank 35, the cooled purified neutral liquor is pumped by pump 37 through the conduit 38 into the secondary extraction vessel 39, the latter being provided with a jacket 40. Sufficient purified liquor is pumped into extraction vessel 39 so that the level of the purified liquor in said vessel is maintained at about the line B—B which is preferably 2 to 3 inches below the overflow outlet 41.

The secondary extractant is maintained in the storage tank 42 and pumped therefrom by means of a pump 43. It passes through conduit 44, through condenser 45, conduit 46, and to the crowfoot distributor 47 provided with apertures 48. The condenser 45 is maintained in a bath 49 at such a temperature as to deliver a condensate of the secondary extractant to the extraction vessel 39 at a temperature several degress below the boiling point of the secondary extractant. When diethyl ether is used, the latter is delivered to the extraction vessel 39 at a few degrees below 34° C., which is the boiling point of diethyl ether.

As soon as the secondary extractant which is capable of extracting dihydroxy benzenes or derivatives thereof from the purified neutral liquor, passes into the extraction vessel 39, the actual extraction process begins and there is also formed on the upper surface of the purified neutral liquor a layer of the secondary extractant carrying dissolved therein the dihydroxy benzenes or derivatives thereof. When this layer 50 reaches the level of the overflow pipe 41, it automatically overflows into the still 51 equipped with a temperature control jacket 52. When the secondary extractant carrying the dihydroxy benzenes or derivatives thereof reaches the level C—C in the still 51, the pump 43 is stopped and valve 53 is closed and valve 54 is opened. Steam is then turned into the jacket 52 of still 51 and the extraction agent such as diethyl ether is vaporized, said vapors passing through the conduit 55 to condenser 45. After condensation in condenser 45, the liquid flows downwardly through conduit 46 to the crowfoot distributor 47. Thus, the secondary extractant is cycled continuously until a sample drawn off at test pipe 56 shows no appreciable residue upon evaporation. When this point has been reached, the steam is shut off from jacket 52 of still 51. Water is then pumped into extraction vessel 39 through conduit 57 and valve 58 until the ether layer in extraction vessel 39 has been overflowed through conduit 41. Valves 53 and 59 are then closed and valve 60 opened. Steam is then turned into the jacket 52 of still 51 and the secondary extractant removed completely by vaporization through the conduit 55, condenser 45, and back to the secondary extractant storage tank 42 through conduit 61. The material left in extraction vessel 39 is discarded in any one of the usual ways. The material remaining in the still 51 is a purified dihydroxy benzene product containing some water and a trace of organic impurities, the amount of water present depending upon the specific kind of dihydroxy benzene being produced. In the case of resorcin, the amount of water may approximate 19% to 20%; in the case of catechol it may approximate 9% to 10%; in the case of hydroquinone, the amount may be as small as from 3% to 5%. The mode of solvent removal determines the amount of water remaining in the product.

In order to remove the purified dihydroxy benzene material from the still 51, steam is bled into the jacket 52 and the dihydroxy benzene material heated above its setting point. In molten form, it is then withdrawn to storage or shipping containers.

If anhydrous material is desired, the water may be substantially completely removed by applying a vacuum either to the material while it is still in still 51 or the dehydration operation may be carried out in a separate still by the application of vacuum.

When the material produced in still 51 is resorcin, before dehydration the resorcin containing material will have a setting point of between 50° to 55° C., and after dehydration to a substantially anhydrous condition, the resorcin product which is 99% pure, has a setting point of 105° C. or higher.

When the material produced in the still 51 is catechol before dehydration, the catechol material may have a setting point of between 75° to 80° C., and after dehydration to a substantially anhydrous condition, the catechol product which is approximately 99% pure, has a setting point of 99° C. or higher.

When the material produced in the still 51 is hydroquinone before dehydration, the hydroquinone material may have a setting point of between 160° to 165° C., and after dehydration to a substantially anhydrous condition, the hydroquinone product which is approximately 99% pure, has a setting point of 168° C. or higher.

When the dihydroxy benzene product to be extracted is resorcin, the organic impurities that are removed from the neutral liquor are primarily phenol, hydroxydiphenylsulfone, and the like. When the dihydroxy compound to be recovered from the neutral liquor is catechol, the impurities that are to be removed from the liquor are primarily ortho-chloro-phenol, ortho-dichloro-benzene, and other organic impurities.

It may be pointed out that 100 gallons of a typical catechol neutral liquor may contain 180 pounds of catechol, 30 pounds of ortho-chlorophenol, and 150 pounds of a mixture of various impurities. The herein described method may be used in general to separate monohydroxy aromatic compounds, and especially monohydroxy benzene or derivatives thereof from dihydroxy compounds and especially dihydroxy benzene and derivatives thereof.

While ether has been set forth as the preferred secondary extractant, it is desired to indicate that broadly any organic extractant may be used which will extract the dihydroxy benzene or derivatives therefrom from an aqueous solution thereof, said extractant which functions to dissolve the dihydroxy benzene compounds being substantially insoluble in water and preferably characterized by a boiling point in the neighborhood of 30° to 120° C. to facilitate the recovery of the extractant or solvent. Preferably, the secondary extractant should also be characterized by a relatively high speed of solution. By this is meant that a given amount of dihydroxy benzene or derivative thereof must be extracted in a reasonable length of time. For example, using ether, the dihydroxy benzene constituent may be extracted from 250 to 275 gallons of an aqueous solution containing the dihydroxy benzene in from 3 to 6 hours. However, if butyl alcohol is used, the same amount of liquor containing the dihydroxy benzene can only be extracted in a much greater time period, which will probably be around 45 to 50 hours. When isopropyl ether is used as a secondary extractant for 250 to 275 gallons of liquor of the character which is introduced into extraction vessel 39, then the extraction period will be in the neighborhood of 5 to 8 hours. However, the isopropyl ether is characterized by a rather high boiling point, the latter being around 82° C. The above discussion clearly indicates that while the preferred organic extractant should speedily extract the dihydroxy benzene or equivalents in a period varying between 3 to 8 hours and preferably 3 to 6 hours, this aspect of the invention is not limited to a secondary extractant of this character. In general, the alkyl ethers, and especially the dialkyl ethers which are liquid at ordinary temperatures; that is, around room temperature, and which do not have boiling points exceeding 120° C., function most satisfactorily as secondary extractants, subject to the further limitation that these dialkyl ethers and equivalents should be substantially insoluble in water. Instead of using a single dialkyl ether, the secondary extraction medium may comprise a mixture of dialkyl ethers, as for example, diethyl ether and dipropyl ether or isopropyl ether, the dialkyl ether being preferably, although not necessarily, present in a predominating proportion.

In the claims, the expression "dihydroxy benzene compounds" is intended to cover a dihydroxy benzene itself, such as resorcin, catechol, or hydroquinone, or derivatives thereof. Likewise, in the claims, the expression "monohydroxy benzene compounds" is intended to cover a monohydroxy benzene, as for example, phenol, or derivatives of a monohydroxy benzene.

Having thus described the invention, what is claimed as new and desired to be secured by Letters Patent is:

1. The method comprising treating an aqueous liquor which is faintly acid to Congo red paper with sulphuric acid and contains a predominating proportion of dihydroxy compounds selected from the group consisting of resorcin, catechol and hydroquinone, and minor proportions of impurities comprising passing into said body of liquor in finely divided form an organic solvent substantially insoluble in said aqueous solution and which dissolves said impurities but leaves the dihydroxy benzene compounds unextracted, said solvent being selected from the group consisting of benzol, toluol and mixtures of benzol and toluol, maintaining said liquor at a temperature below the boiling point of said extraction medium, maintaining upon the upper surface of said body of liquor a layer of said extraction medium containing dissolved organic impurities, and simultaneously an overflow thereof to a distillation vessel, distilling from the overflow of said extraction medium, condensing said extraction medium, introducing the extraction medium in its condensed state into the body of liquor being treated, continuing the extraction of the liquor until a sample of the overflow indicates that substantially all of the organic impurities have been extracted from the liquor, removing the extraction medium containing impurities which floats on the top surface of the liquor, distilling the same to recover the primary extraction medium for further use in the process, recovering the separated impurities, cooling the so-prepared liquor to a temperature below that at which a secondary extraction medium with which the liquor is subsequently treated boils, treating the so-purified liquor with a secondary extraction medium which dissolves and extracts from the purified liquor the dihydroxy benzene present, said secondary extraction medium being selected from the group consisting of lower dialkyl ethers and lower aliphatic alcohols insoluble in water, and recovering from the resulting extraction liquor the dihydroxy benzene present therein.

2. The method comprising treating a resorcin-containing aqueous liquor which is faintly acid to Congo red paper with sulphuric acid and contains from 5% to 20% of resorcin, 1% to 15% of organic impurities, 1% to 26% of sodium sulphate, and 0% to .5% of free sulphuric acid, comprising passing benzol in a finely divided form into said body of liquor to dissolve said organic impurities present therein but leave the resorcin unextracted, maintaining said liquor at a temperature below the boiling point of the benzol, maintaining upon the upper surface of said body of liquor a layer of benzol containing dissolved organic impurities, and simultaneously an overflow thereof to a distillation vessel, distilling benzol from the overflow, condensing the benzol, introducing the latter in its condensed state into the body of liquor being treated, continuing the extraction of the liquor until a sample of the overflow indicates that substantially all of the organic impurities have been extracted from the liquor, removing benzol containing organic impurities, said benzol floating on the top surface of the liquor, distilling the same to recover the benzol for further use in the process, recovering the separated impurities, cooling the so-prepared liquor to a temperature below that at which a lower dialkyl ether with which the liquor is subsequently treated boils, treating the so-purified liquor with a lower dialkyl ether which dissolves and extracts from the purified liquor the resorcin present, and recovering from the resulting extraction liquor the resorcin present therein.

3. The method comprising treating a resorcin-containing aqueous liquor which is faintly acid to Congo red paper with sulphuric acid and contains from 5% to 20% of resorcin, 1% to 15% of organic impurities, 1% to 26% of sodium sulphate, and 0% to .5% of free sulphuric acid, comprising passing into said body a primary extraction medium substantially insoluble in said aqueous solution and which dissolves said impurities but leaves the resorcin unextracted, said primary extraction medium being selected from the group consisting of benzol and toluol and mixtures thereof, maintaining said liquor at a temperature below the boiling point of said primary extraction medium, maintaining upon the upper surface of said body of liquor, a layer of said extraction medium containing dissolved impurities, and simultaneously an overflow thereof to a distillation vessel, distilling from the overflow said primary extraction medium, condensing said primary extraction medium, introducing the primary extraction medium in its condensed state into the body of liquor being treated, continuing the extraction of the liquor until a sample of the overflow indicates that substantially all of the organic impurities have been extracted from the liquor, removing the extraction medium containing the impurities which floats on the top surface of the liquor, distilling the same to recover the primary extraction medium for further use in the process, recovering the separated impurities, cooling the so-prepared liquor to a temperature below that at which a secondary extraction medium with which the liquor is subsequently treated boils, treating the so-purified liquor with a secondary extraction medium which dissolves and extracts from the purified liquor the resorcin present therein, said secondary extraction medium being selected from the group consisting of lower dialkyl aliphatic ethers and lower aliphatic alcohols insoluble in water, and recovering from the extraction liquor the resorcin present therein.

WILLIAM J. COTTON.